M. E. ROZE.
TRACTOR.
APPLICATION FILED OCT. 11, 1917.
1,265,388.
Patented May 7, 1918.
2 SHEETS—SHEET 2.
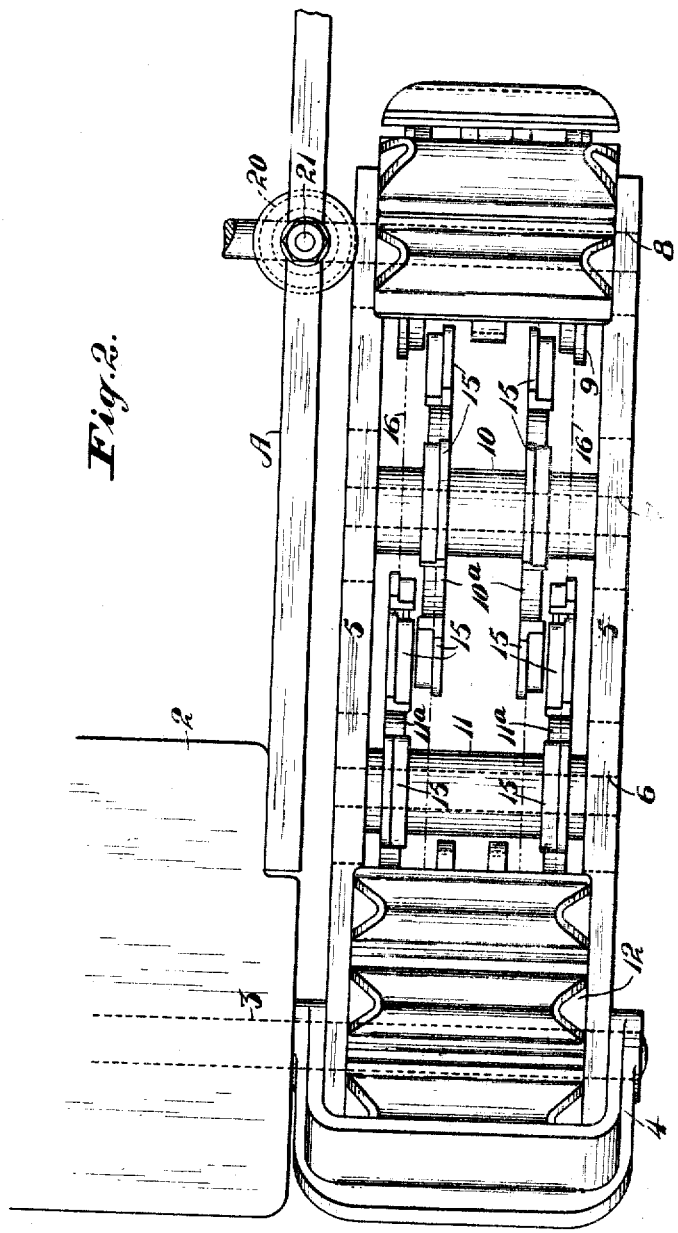
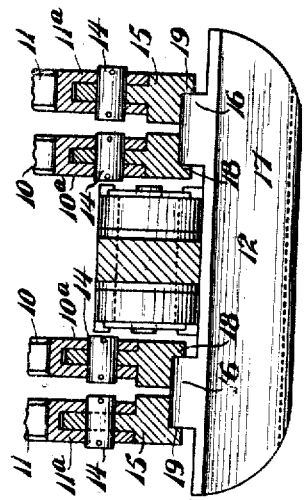
WITNESS:
F. C. Fliedner
J. C. Benesch
INVENTOR.
Martin E. Roze
BY Strong & Townsend
ATTORNEYS.

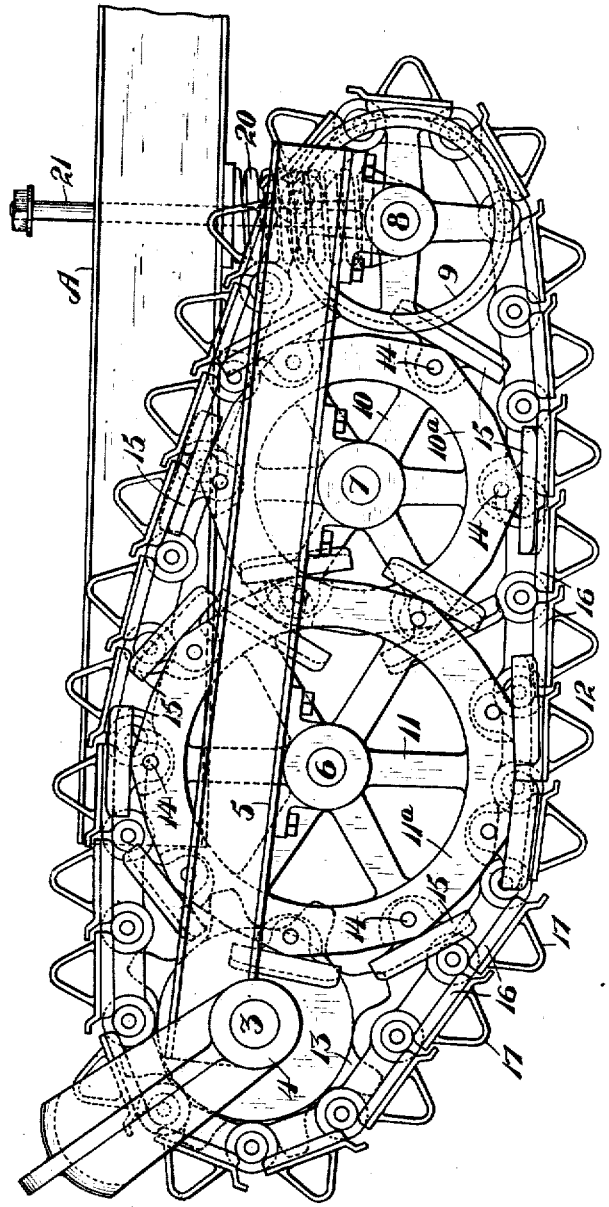

UNITED STATES PATENT OFFICE.

MARTIN E. ROZE, OF STOCKTON, CALIFORNIA.

TRACTOR.

1,265,388.   Specification of Letters Patent.   Patented May 7, 1918.

Application filed October 11, 1917.  Serial No. 195,907.

*To all whom it may concern:*

Be it known, that I, MARTIN E. ROZE, a citizen of the United States, residing at Stockton, in the county of San Joaquin and State of California, have invented new and useful Improvements in Tractors, of which the following is a specification.

This invention relates to a tractor of the self-laying track type and particularly to the track construction and mounting.

One of the objects of the present invention is to provide a novel form of self-laying track, and in conjunction therewith a truck, a driving sprocket, and an idler to support and drive the track. Another object of the invention is to provide a pair of intermediate idlers each provided with shoes engageable with the track, said shoes adapted to carry the load of the tractor to relieve the link pins in the track of the shearing strains of the load and also to permit a free rocking movement of each link in the track. Further objects will hereinafter appear.

The invention consists of the parts and the construction and combination of parts as hereinafter more fully described and claimed, having reference to the accompanying drawings, in which—

Figure 1 is a side elevation partly broken away, showing the general arrangement of the track and the truck and idlers supporting the same.

Fig. 2 is a plan view partly in section.

Fig. 3 is a cross section of the track, showing the position of the intermediate supporting idlers.

Referring to the drawings in detail, A indicates the main frame of a tractor, 2 a transmission case to which power is delivered from an internal combustion engine or other suitable source, and 3 indicates a drive shaft to which the power is delivered. This drive shaft extends crosswise of the transmission case and its ends are extended sufficiently far to straddle a bearing bracket indicated at 4. The present drawings illustrate one side of the tractor only, and as the sides are duplicates of each other it is obvious that two bearing brackets, such as shown at 4, are provided, one being positioned on each side of the transmission case.

Pivotally mounted on the shaft 3, within the bracket 4, is a truck frame which consists of a pair of channel beams 5. These beams are secured together by three shafts, such as shown at 6, 7 and 8. The shafts are rigidly secured in bearing brackets and serve two functions: First, they maintain the beams 5 interspaced and rigid with relation to each other and, second, they serve as supports for idlers, generally shown at 9, 10 and 11. These idlers are turnably mounted on the shafts and are provided for the purpose of supporting the endless track 12.

Secured on the shaft 3, in alinement with the idlers 9, 10 and 11, is a driving sprocket 13. This sprocket transmits power to drive the chain track, while the idlers, as previously described, merely serve as a support for the same. The foremost idler 9 is drum-shaped while the idlers 10 and 11 consist of two separate flanged sections $10^a$ and $11^a$; the flanged sections $10^a$ of the idler 10 being set sufficiently close together to pass between the flanged sections $11^a$ of the idler 11 (see Figs. 2 and 3). Pivotally mounted, as at 14, in the flanged sections of the idlers 10 and 11 is a plurality of shoes 15, and formed on the inner faces of the links forming the track are track pads 16. These pads are arranged one on each side of the main links 17, and as the flanged sections of the idlers are widely separated, the shoes carried by the sections $10^a$ will engage the inner sides of the track pads, as shown at 18, while the shoes carried by the sections $11^a$ will engage the outer sides of the track pads, as shown at 19. The whole weight of the tractor is in this manner carried by the intermediate idlers and the shoes 15, thereby relieving the pins connecting the links of the track from the shearing load of the tractor and at the same time permitting a free rocking movement of each link in the track. The weight of the tractor is, furthermore, more evenly distributed as it is not only supported by the idler 11 but also by the idler 10, said load being in turn distributed to the shoes which are widely separated and free to rock about their pivotal points when certain undulations in the road surface are encountered.

The truck as a whole is permitted to pivot upon the drive shaft 3, but this pivotal movement is limited to a certain extent by springs 20 which are interposed between the forward end of the truck and the main frame A, a guide rod 21 being provided for the purpose of securing the truck against lateral movement. The construction of the individual links from which the track is built up may be varied, but I wish it understood that the inner faces of the shoes carried by the links must in all instances be provided with track pads, such as shown at 16, as these are essential to serve as a support for the shoes 15 and also to relieve the link pins of the shearing strain or weight of the tractor, the only wear to which the link pins are subjected being the pull of the track.

The most important feature of the present invention is the provision of the intermediate idlers 10 and 11, together with the specific construction of same which permits an even distribution of the load and a free rocking movement of the links in the track. The exact mounting of the truck frame, together with the spring support and other details of construction, may be varied without departing from the spirit of the present invention.

I also wish it understood that the materials and finish of the several parts comprising the track, idlers and truck may be such as the experience and judgment of the manufacturer may dictate.

Having thus described my invention, what I claim and desire to secure by Letters Patent is—

1. In a vehicle of the self-laying track type, a supporting truck mechanism for the main frame including a roller having shoes arranged to support the track.

2. In a vehicle of the self-laying track type, a truck frame, a driving sprocket and an idler journaled in the frame, an endless track carried by said sprocket and idler, an intermediate idler, and a plurality of shoes on said idler adapted to engage the track.

3. In a vehicle of the self-laying track type, a truck frame, a driving sprocket and an idler journaled in the frame, an endless track carried by said sprocket and idler, an intermediate idler, and a plurality of pivotally mounted shoes on said idler adapted to engage the track.

4. In a vehicle of the self-laying track type, a truck frame, a driving sprocket and an idler journaled in the frame, an endless track carried by said sprocket, a pair of intermediate idlers positioned between the driving sprocket and the first named idler, and a plurality of shoes pivotally attached to the intermediate idlers adapted to engage the track and carry the weight of the tractor.

5. In a vehicle of the self-laying track type, a truck frame, a driving sprocket and an idler journaled in the frame, an endless track carried by said sprocket, a pair of intermediate idlers positioned between the driving sprocket and the first named idler, a plurality of shoes pivotally attached to the intermediate idlers adapted to engage the track and carry the weight of the tractor, and pads on the track adapted to receive the shoes.

6. In a vehicle of the self-laying track type, a truck frame, a driving sprocket and an idler journaled in the frame, an endless track carried by said sprocket and idler, an intermediate idler, a plurality of pivotally mounted shoes on said idler adapted to engage the track, and pads on the track adapted to receive the shoes.

7. In a vehicle of the self-laying track type, a truck frame, a driving sprocket and an idler journaled in the frame, an endless track carried by said sprocket, a pair of intermediate idlers positioned between the driving sprocket and the first named idler, said idlers being each provided with a pair of interspaced annular flanges and the flanges on one idler being sufficiently wide to straddle the flanges of the other idler, and a plurality of shoes pivotally attached to the flanges of each idler, said shoes adapted to engage the track and carry the load of the tractor.

8. In a vehicle of the self-laying track type, a truck frame, a driving sprocket and an idler journaled in the frame, an endless track carried by said sprocket, a pair of intermediate idlers positioned between the driving sprocket and the first named idler, said idlers being each provided with a pair of interspaced annular flanges, and the flanges on one idler being sufficiently wide to straddle the flanges of the other idler, a plurality of shoes pivotally attached to the flanges of each idler, said shoes adapted to engage the track and carry the load of the tractor, and pads on the track adapted to receive the shoes, and said shoes being reversed with relation to each other so that the shoes on one idler will engage the inner sides of the pads while the shoes on the other idler will engage the outer side of the pads.

In testimony whereof I have hereunto set my hand in the presence of two subscribing witnesses.

MARTIN E. BOZE.

Witnesses:
J A ROSE
MARGARET M. KING